United States Patent
Favaretto

(10) Patent No.: US 11,173,876 B2
(45) Date of Patent: *Nov. 16, 2021

(54) HIGH-PERFORMANCE ROAD VEHICLE WITH AUTOMATIC CONFIGURATION ACQUISITION AND CORRESPONDING CONTROL METHOD

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 222 days.

This patent is subject to a terminal disclaimer.

(21) Appl. No.: 16/437,087

(22) Filed: Jun. 11, 2019

(65) Prior Publication Data

US 2020/0001872 A1 Jan. 2, 2020

(30) Foreign Application Priority Data

Jun. 11, 2018 (IT) .......................... 102018000006212

(51) Int. Cl.
*B60R 25/24* (2013.01)
*B60R 25/01* (2013.01)
(Continued)

(52) U.S. Cl.
CPC ............ *B60R 25/241* (2013.01); *B60R 25/01* (2013.01); *B60R 25/209* (2013.01); *B60W 30/18* (2013.01);
(Continued)

(58) Field of Classification Search
CPC ..... B60R 25/241; B60R 25/01; B60R 25/209; B60R 2325/207; B60R 13/10;
(Continued)

(56) References Cited

U.S. PATENT DOCUMENTS 8,798,852 B1 * 8/2014 Chen ....................... G06F 21/44
701/32.6
9,738,125 B1 8/2017 Brickley et al.
(Continued)

FOREIGN PATENT DOCUMENTS

DE 10021811 A1 * 11/2001 ............. B60R 25/04
DE 10021811 A1 11/2001
(Continued)

OTHER PUBLICATIONS

Search Report issued in Italian Application No. 201800006212, completed Feb. 13, 2019; 8 pages.
(Continued)

*Primary Examiner* — Abby Y Lin
*Assistant Examiner* — Esvinder Singh
(74) *Attorney, Agent, or Firm* — Cantor Colburn LLP

(57) ABSTRACT

High-performance road vehicle having: a plurality of replaceable or removable components; a control unit that supervises the operation of the road vehicle; at least one electronic identification device, which is fitted on a corresponding component, has a memory designed to contain at least one unique identifying code of the component and has a first transmission organ designed to send the data contained in the memory; and a second transmission organ designed to communicate with the first transmission organ and connected to the control unit to allow the control unit to interact with the electronic identification device.

15 Claims, 3 Drawing Sheets

(51) Int. Cl.
  *G07C 5/08* (2006.01)
  *B60W 50/00* (2006.01)
  *B60R 25/20* (2013.01)
  *B60W 30/18* (2012.01)

(52) U.S. Cl.
  CPC ............. *B60W 50/00* (2013.01); *G07C 5/085* (2013.01); *G07C 5/0808* (2013.01); *B60R 2325/207* (2013.01); *B60W 2050/0014* (2013.01); *B60W 2556/00* (2020.02); *B60W 2556/45* (2020.02); *B60Y 2200/114* (2013.01)

(58) Field of Classification Search
  CPC ...... B60R 2025/1016; B60R 2325/101; B60R 2325/105; B60R 16/023; B60R 16/0231; B60R 16/0232; B60R 25/04; B60R 2025/0415; B60R 16/0234; B60W 30/18; B60W 50/00; B60W 2556/00; B60W 2556/45; B60W 2050/0014; B60W 2050/0095; B60W 50/082; B60W 40/06; B60W 40/02; B60W 50/14; B60W 2050/0067; B60W 2550/141; B60W 2550/147; B60W 2550/406; B60W 2550/12; B60W 50/029; B60W 50/12; B60W 50/08; B60W 50/0205; B60W 2300/28; B60W 2050/0089; B60W 2050/0088; B60W 2050/021; B60W 2050/0078; B60W 2050/046; B60W 2050/0026; B60W 2050/0005; B60W 2050/0295; B60W 2050/0013; B60W 2050/0016; B60W 2050/0043; B60W 2050/0001; B60W 2050/0081; B60W 2050/0027; B60W 2050/0086; B60W 2520/105; B60W 2556/60; B60W 2556/50; B60W 2540/06; B60W 30/184; B60W 2050/0082; B60W 2050/0006; G07C 5/0808; G07C 5/085; G07C 5/006; G07C 5/08; G07C 5/0816; G07C 5/0841; B60G 2600/202; B60G 2400/252; B60G 17/00; B60C 23/003; G05B 23/0283; G05B 2219/2637; G05B 23/0275; G05B 23/0235; G05B 9/02; G05B 23/02; G05B 11/01; B60Y 2200/114
  See application file for complete search history.

(56) References Cited

U.S. PATENT DOCUMENTS

| | | | | |
|---|---|---|---|---|
| 10,109,119 | B2* | 10/2018 | Keane | G07C 5/0808 |
| 10,719,997 | B1* | 7/2020 | Aiello | G01R 31/007 |
| 2002/0037707 | A1 | 3/2002 | Yoshioka et al. | |
| 2005/0143883 | A1* | 6/2005 | Yamagiwa | G06Q 10/06 701/29.6 |
| 2006/0180647 | A1* | 8/2006 | Hansen | B60S 3/00 235/375 |
| 2010/0315204 | A1* | 12/2010 | Kamel | B61K 9/04 340/10.51 |
| 2012/0123611 | A1* | 5/2012 | Grasso | B60R 25/00 701/1 |
| 2012/0206243 | A1* | 8/2012 | Butler | H01Q 1/2225 340/10.51 |
| 2017/0372534 | A1* | 12/2017 | Steketee | G07C 5/008 |
| 2018/0037117 | A1 | 2/2018 | Koebler et al. | |
| 2018/0276907 | A1* | 9/2018 | Solazzo | H04W 4/44 |
| 2019/0080524 | A1* | 3/2019 | Tucker | G07C 5/0841 |
| 2019/0244169 | A1* | 8/2019 | Burnett | G06K 19/07786 |
| 2020/0242677 | A1* | 7/2020 | Popli | G06Q 10/087 |

FOREIGN PATENT DOCUMENTS

| | | |
|---|---|---|
| DE | 102005024818 A1 | 11/2006 |
| EP | 0325298 A2 | 7/1989 |
| EP | 0325298 A3 | 7/1989 |
| JP | H07228121 A | 8/1995 |

OTHER PUBLICATIONS

Search Report issued in European Patent Application No. EP 19179429.6-1132 dated Dec. 17, 2019; 11 pages.

* cited by examiner

| | | | |
|---|---|---|---|
| IDC | 145YBA14UK3F | UC | 146,2 |
| | | UCeqv1 | 104,3 |
| VS | 1.2.04 | | |
| IDCM | 058-458-2687B | UC10 | 4,6 |
| DTM | 27/01/2018 | UC20 | 11,5 |
| DTO | 14/02/2017 | UC30 | 6,5 |
| CT1 | 0,354 | UC40 | 7,5 |
| CT2 | 2 | UC50 | 8,9 |
| CT3 | 1 | UC60 | 19,8 |
| STR1 | 425 | UC70 | 28,6 |
| STR2 | 32,44 | UC80 | 32,6 |
| UC | 132,6 | UC90 | 8,3 |
| UCeqv1 | 98,7 | UC100 | 8,4 |
| | | UCeqv2 | 89,7 |

Fig.3

HIGH-PERFORMANCE ROAD VEHICLE WITH AUTOMATIC CONFIGURATION ACQUISITION AND CORRESPONDING CONTROL METHOD

CROSS-REFERENCE TO RELATED APPLICATIONS

This patent application claims priority from Italian patent application no. 102018000006212 filed on Jun. 11, 2018, the entire disclosure of which is incorporated herein by reference.

TECHNICAL FIELD

The present invention relates to a high-performance road vehicle and to a corresponding control method.

PRIOR ART

A high-performance road vehicle is normally designed to be able to circulate freely in traffic-open roads and is therefore normally designed both to comply with all the requirements of the homologation standards (e.g. with regard to noise and pollutant emissions) and to deal with irregularities (holes, bumps . . . ) of traffic-open roads without damage (e.g. with regard to the height from the ground and to the stiffness of the suspension).

A high-performance road vehicle is often used not only in traffic-open roads, but also in a race track. To maximize its performance the road vehicle is "prepared" either by changing the settings in the control software (by replacing the approved electronic control units with as many racing electronic control units or by activating racing control modes in the approved electronic control units) or by replacing approved components with as many racing components (wheels, tires, brakes, shock absorbers/springs, torsion bars, exhaust system, seats, steering wheel . . . ).

While modifying the configuration of the road vehicle (i.e. the set of hardware components of the road vehicle and the software settings that regulate its operation), possible errors or omissions make the configuration inconsistent: for example racing components or racing settings in the control software could be dropped off (forgotten) when the road vehicle returns to traffic-open roads (with the risk of damaging the road vehicle and also of being punished for using an irregular road vehicle), or approved components or road settings in the control software could be dropped off (forgotten) when the road vehicle travels on a race track (with the risk of damaging the road vehicle and above all of not allowing the road vehicle to express its full potential).

Patent applications US2012123611A1, DE10021811A1 and DE102005024818A1 describe a road vehicle comprising: a plurality of electronic components (e.g. ECU—Electronic Control Unit-, ABS—Anti-lock Brake System-ESP—Electronic Stability Control, EPS—Electronic Power Steering . . . ); a control unit that supervises the operation of the road vehicle; a wired communication network (e.g. operating according to the CAN, LIN, FlexRay or MOST protocol) connecting the electronic components with the control unit; and a plurality of electronic identification devices, each of which is fitted on a corresponding component, comprises a memory designed to contain at least one univocal identifying code of the component and is designed to communicate the identifying code to the control unit through the communication network.

DESCRIPTION OF THE INVENTION

The object of the present invention is to provide a high-performance road vehicle and a corresponding control method, which high-performance road vehicle always guarantees to be used with a consistent and context-suited configuration and, at the same time, is easy and inexpensive to manufacture.

According to the present invention, it is therefore provided a high-performance road vehicle and a corresponding control method, as claimed in the appended claims.

The claims describe preferred embodiments of the present invention forming an integral part of the present description.

BRIEF DESCRIPTION OF THE DRAWINGS

The present invention will now be described with reference to the annexed drawings showing a non-limiting embodiment, in which:

FIG. 3 is a schematic view of part of the contents of a programmable memory of the electronic identification device of FIG. 2.

PREFERRED EMBODIMENTS OF THE INVENTION

Figure 1:
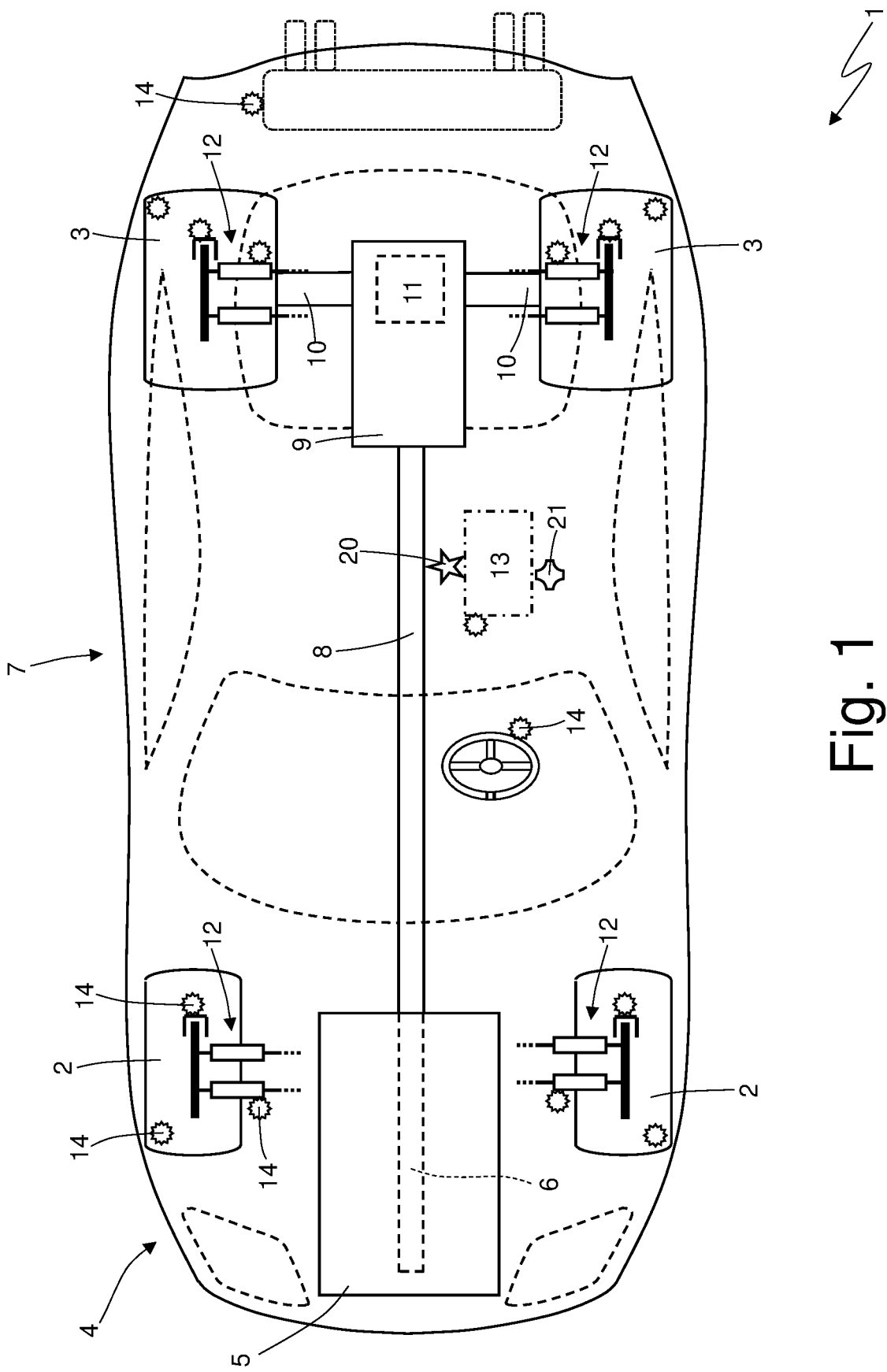
FIG. 1 is a schematic view of a high-performance road vehicle made in accordance with the present invention.

Number 1 in FIG. 1 indicates as a whole a high-performance road vehicle provided with two front wheels 2 and two rear driving wheels 3, which receive the driving torque from a power propulsion system 4.

The power propulsion system 4 comprises an internal combustion heat engine 5, which is arranged in a front position and is provided with a drive shaft 6, and a servo-controlled transmission 7, which transmits the driving torque generated by the internal combustion heat engine 5 to the rear driving wheels 3. The servo-controlled transmission 7 comprises a transmission shaft 8, which on the one side is angularly integral with the drive shaft 6 and on the other side is mechanically connected to a servo-controlled dual-clutch gearbox 9, which is arranged in a rear position and transmits the motion to the rear driving wheels 3 by means of two axle shafts 10 that receive the motion from a differential 11.

The road vehicle 1 comprises a plurality of components, which are more or less easily replaceable depending on the fact that the road vehicle 1 is used in traffic-open roads (and therefore must meet all the requirements of the homologation standard and must be sufficiently "robust" to deal with traffic irregularities without damage) or is used in a race track (namely, in a protected and private environment). For example, the replaceable components can be: the tires of the wheels 2 and 3, the rims of the wheels 2 and 3, the springs and dampers of the suspensions 12, the callipers and the pads of the disc brakes, exhaust system parts, the seats of the passenger compartment, the steering wheel, the torsion bars (and obviously many others that were not mentioned in this purely illustrative list). Some components of the road vehicle 1 could also simply be disassembled (i.e. removed) without being replaced to lighten the road vehicle 1 or to reduce the aerodynamic drag during use in a race track. For example, the passenger seat, the rear-view mirrors, the number plates, the wipers could be removed.

The road vehicle 1 is driven by an electronic control unit 13, which supervises the operation of the road vehicle 1. For example, the control unit 13 controls the generation of the driving torque of the internal combustion heat engine 5 and the gearshift couplings in the gearbox 10. Obviously, the control unit 13 can be formed by several physically independent control units that communicate with each other through a communication BUS.

As shown in FIG. 1, the road vehicle 1 comprises a plurality of electronic identification devices 14, each of which is fitted (in a way generally separable only by destruction) in a corresponding component (namely, an electronic identification device 14 is fitted in each tire of the wheels 2 and 3, an electronic identification device is fitted in each rim of the wheels 2 and 3, an electronic identification device 14 is fitted in each spring and in each suspension shock absorber 12, an electronic identification device 14 is fitted in each calliper of the disc brakes, an electronic identification device 14 is fitted in each exhaust system part, an electronic identification device 14 is fitted in each seat of the passenger compartment, an electronic identification device 14 is fitted in the steering wheel, an electronic identification device 14 is fitted in each torsion bar, an electronic identification device 14 is fitted in each rear-view mirror, an electronic identification device 14 is fitted in each electronic control unit, an electronic identification device 14 is fitted in each license plate holder . . . ). The electronic identification devices 14 can be coupled to any type of component, from the larger components (even the frame or the base of the internal combustion heat engine 5, the body panels, the front hood, the rear hood . . . ) to the smaller components (the spark plugs of the internal combustion heat engine 5, the fuel injectors of the internal combustion heat engine 5, the control levers of the gearbox 9 arranged in the passenger compartment, the accelerator pedal and the brake pedal . . . ).

Usually, each electronic identification device 14 is fixed in a way generally separable only by destruction to the corresponding component, so that the removal of the electronic identification device 14 from the component requires the destruction of the electronic identification device 14. In other words, an electronic identification device 14 is never separated from the corresponding component except in the event of a malfunction of the electronic identification device 14 (in this event, the old malfunctioning electronic identification device 14 is "torn" in a destructive manner from the component and replaced with a new correctly operating electronic identification device 14).

Figure 2:
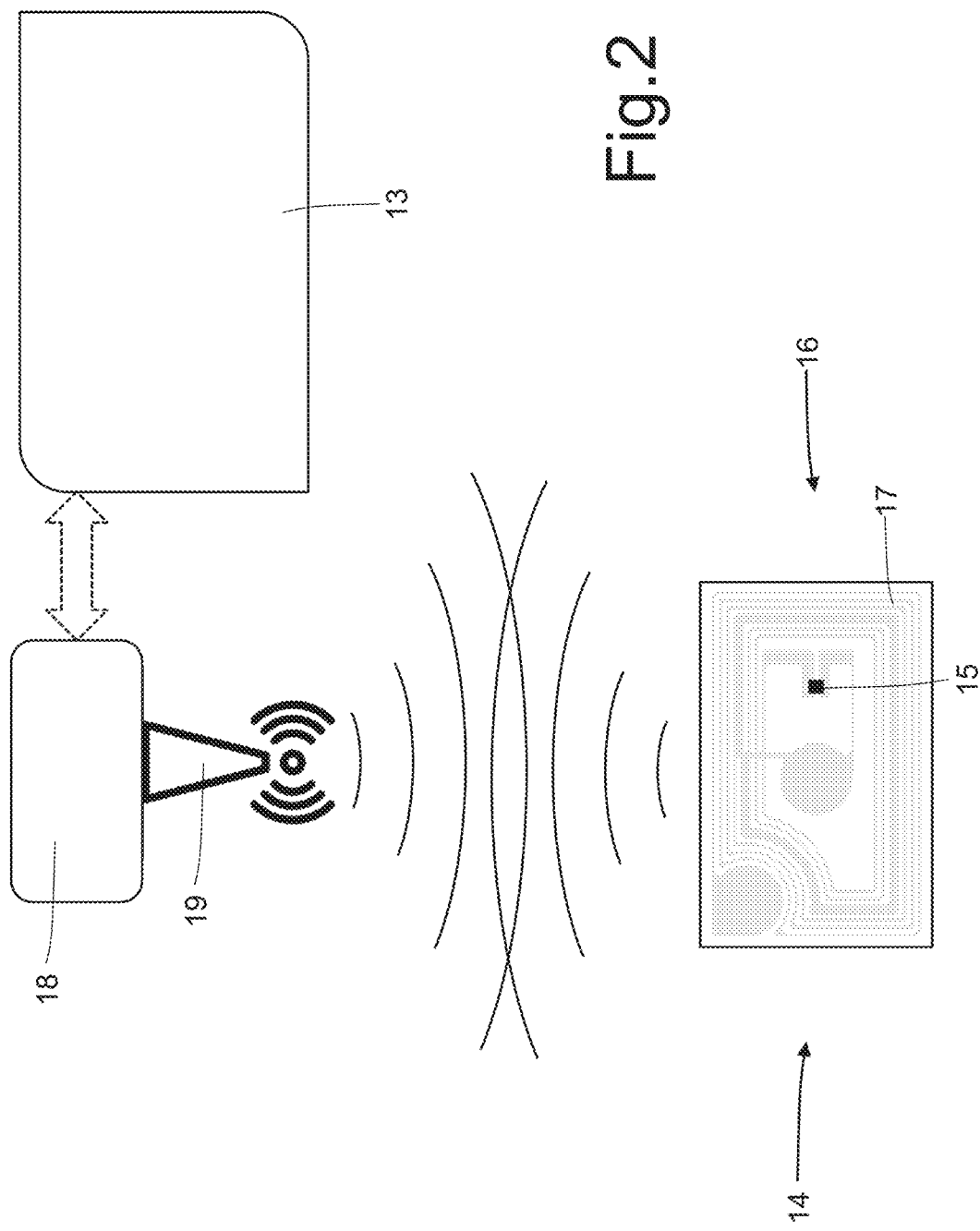
FIG. 2 is a schematic view of an electronic identification device and of a transmission organ of the high-performance road vehicle of FIG. 1.

As shown in FIG. 2, each electronic identification device 14 comprises a programmable memory 15 designed to contain a series of data of the component and comprises a wireless transmission organ (i.e. using electromagnetic waves) that is designed to send and receive the data contained in the programmable memory 15 and comprises, among other things, an antenna 17. According to a possible, but non-limiting embodiment, the electronic identification devices 14 are formed by passive transponders (i.e. lacking their own electric power source). According to other embodiments, the electronic identification devices 14 are active (i.e. provided with their own rechargeable electric power source) and are for example able to transmit according to the Bluetooth® protocol. A "mixed" situation is also possible, namely one in which some electronic identification devices 14 are passive transponders (e.g. for smaller and/or simpler components), while other electronic identification devices 14 are active (e.g. for larger and/or more complex components).

Each electronic identification device 14 has a flattened shape (particularly when it consists of a passive transponder, which is generally shaped like a label). Generally, the electronic identification devices 14 (shaped like labels) are glued directly on the outer surface of the corresponding components, namely an electronic identification device 14 is fixed to the outer surface of a corresponding component by interposing a permanent (and generally very tough) glue. The permanent glue that connects the electronic identification device 14 to the outer surface of a corresponding component can be applied in a fluid (more or less dense) form or can be applied in the form of a double-sided tape.

As shown in FIG. 2, the road vehicle 1 comprises a wireless transmission organ 18 (i.e. using electromagnetic waves), which is connected to the control unit 13, is designed to communicate with the transmission organ 16 of each electronic identification device 14 and is arranged in a fixed position inside the road vehicle 1. The wireless transmission organ 18 could be integrated in the control unit 13 or could be physically separated from the control unit 13 and could communicate with the control unit 13 through the BUS network of the road vehicle 1 or through a dedicated wiring. In particular, the transmission organ 18 comprises at least one antenna 19, which emits and receives radio waves. The transmission organ 18 can possibly comprise a plurality (for example two, three or four) of antennas 19, which are arranged in different positions of the road vehicle 1 to ensure an adequate coverage of the entire road vehicle 1. According to a preferred but not limiting embodiment, the transmission organ 18 comprises a single common communication device, which in use uses in sequence the various antennas 19 to dialogue in sequence with the transmission organs 16 of all the electronic identification devices 14. In other words, the common communication device is connected in sequence with an antenna 19 at a time to interrogate the transmission organs of the electronic identification devices 14 of the components located in the working area of the antenna 19. According to a possible embodiment, the outer surface (i.e. visible from the outside) of the electronic identification device 14 is provided with a print, which indicates in a graphic (or optically readable) form the recognition code and/or function of the electronic identification device 14. The print could reproduce the identifying code of the electronic identification device 14 in the form of a bar code, a QR code and/or an alphanumeric code. By way of example, the print can be obtained by ink printing or by laser engraving. The function of the print is to allow an operator to detect optically (i.e. with his/her own eyes and/or through an optical reader) the identity and/or function of the electronic identification device 14.

According to a possible embodiment shown in FIG. 1, the road vehicle 1 comprises an acceleration sensor 20, which detects the accelerations to which the road vehicle 1 is subjected and is connected to the control unit 13. According to other embodiments not shown, the road vehicle 1 comprises a different number and/or composition of sensors that are designed to measure a physical quantity (temperature, acceleration . . . ) correlated with the (thermal, mechanical, environmental . . . ) stresses to which the components of the road vehicle 1 are subjected. In particular, the sensors can be common to all the components or they can even be installed on specific components (to be dedicated to the corresponding components).

Each electronic identification device 14 is coupled to a corresponding component of the road vehicle 1 and the memory 15 of each electronic identification device 14 contains a series of data relating to the component. Some of these data relate (as better described below) to the shape of the component and therefore they are never modified or are modified very rarely (e.g. during revision interventions or updating interventions), while other data relate (as better described below) to the working life of the component (i.e. contain a record of events of the working life of the component) and are therefore cyclically updated (e.g. every minute) during the operation of the road vehicle 1. In other words, during the operation of the road vehicle 1, the control unit 13 modifies, through the transmission organ 18, the contents of the memory 15 of the electronic identification device 14 to update the events of the working life of the corresponding component.

As shown in FIG. 3, the memory 15 of each electronic identification device 14 contains a univocal identifying code IDC of the corresponding component, which serves to identify with certainty the component. Obviously, this datum is attributed to the component at the time of its production and is never modified.

The memory 15 of each electronic identification device 14 contains a code VS, which indicates the version of the corresponding component or indicates the updating level of the component. This datum is modified after an update of the component.

The memory 15 of each electronic identification device 14 contains a univocal identifying code IDCM of the road vehicle 1 (that serves to a univocal identification of the road vehicle 1) in which the corresponding component is fitted. This datum is modified every time the component is fitted in a new road vehicle 1 and indicates the last road vehicle 1 in which the component was used. In other words, the control unit 13 writes the univocal identifying code IDCM of the road vehicle 1 in the memory 15 of an electronic identification device 14 when the corresponding component is fitted for the first time in the road vehicle 1. According to a different and perfectly equivalent embodiment, several identifying codes IDCM could be provided to store not only the last road vehicle 1 in which the component was used, but the last five (ten, fifteen, twenty . . . ) road vehicles in which the component was used. Each identifying code IDCM could also be associated with a time counter to indicate the total number of hours of use (and/or kilometres travelled) of the component in the corresponding road vehicle 1.

The memory 15 of each electronic identification device 14 contains a first installation date DTM of the corresponding component in the road vehicle 1. This datum is modified every time the component is fitted in a new road vehicle 1 and indicates the date on which the component was fitted for the first time in the last road vehicle 1 in which the component was used. In other words, the control unit 13 writes the first installation date DTM in the memory 15 of an electronic identification device 14 when the corresponding component is fitted for the first time in the road vehicle 1. According to a different and perfectly equivalent embodiment, several first installation dates DTM could be provided to store not only the last road vehicle 1 in which the component was used, but the last five (ten, fifteen, twenty . . . ) road vehicles 1 in which the component was used.

The memory 15 of each electronic identification device 14 contains a last revision date DTO indicating the last time the corresponding component has been subjected to review.

This datum is modified after a revision of the component. According to a possible but not limitative embodiment, the memory 15 of some electronic identification devices 14 contains control parameters CT1-CT3 of the corresponding component. The control parameters CT1-CT3 indicate the optimal control mode of the corresponding component and are normally determined when the component is designed. Furthermore, it is possible that the control parameters CT1-CT3 are customized for each component taking into account the specificity of the component (related to the inevitable constructional tolerances, wear and previous history of the component) and by means of specific tests/measurements on the component. Obviously, there are no control parameters CT1-CT3 for all the components, but only for the more complex components that influence the dynamics of the road vehicle 1. For example, in the case of a tire, a control parameter could indicate the optimal inflation pressure, in the case of an exhaust system part the control parameters could indicate to the control unit 13 the actual counterpressure generated by the component, in the case of a brake calliper the control parameters could indicate the optimal hydraulic pressure to obtain the greatest braking power, in the case of a fuel injector the control parameters could summarize the injection law (i.e. the law that links the injection time to the amount of injected fuel), in the case of a sensor the control parameters could indicate a systematic error to be compensated, the actual relative error, a reading mode compensation when the temperature changes. In use, the control unit 13 reads from the memory 15 of the electronic identification device 14 the optimized values of the control parameters CT1-CT3 of the corresponding component and uses the optimized values to supervise the operating part of the road vehicle 1 involving the component. Alternatively (or in addition), in use the control unit 13 reads from the memory 15 of the electronic identification device 14 the optimized values of the control parameters CT1-CT3 of the corresponding component and displays the optimized values for a manual tuning of the component. In other words, the optimized value of a control parameter CT1-CT3 can be directly used by the control unit 13 in the control processes or it can be used by an operator for a manual tuning (e.g. the tire inflation pressure or a tightening torque to tighten a screw . . . ).

According to a possible, but non-limiting, embodiment shown in FIG. 3, the memory 15 of some electronic identification devices 14 contains stress data STR1 and STR2 correlated with the physical quantities (in the shown embodiment, accelerations) measured by the acceleration sensor 20. The stress data STR1 and STR2 could contain the minimum, maximum and/or mean value of the physical quantity measured by the acceleration sensor 20 (i.e. by the acceleration). In use, the control unit 13 cyclically reads the acceleration sensor 20 and, if necessary, updates the stress data STR1 and STR2 of the memory 15 of each electronic identification device 14.

According to the embodiment shown in FIG. 3, the memory 15 of each electronic identification device 14 contains a use counter UC indicating the actual use (normally measured in hours of operation or in travelled kilometres) of the corresponding component. In use, the control unit 13 cyclically changes, when the road vehicle 1 is used, the contents of the memory 15 of each electronic identification device 14 to increase the use counter UC of the corresponding component.

According to a possible, but non-limiting, embodiment shown in FIG. 3, the memory 15 of each electronic identification device 14 contains an equivalent use counter UCeqv1 indicating the equivalent use (normally measured in hours of operation or in travelled kilometres) of the corresponding component. It is not increased by the actual operating time/actual distance travelled (unlike the use counter UC), but by an equivalent operating time/equivalent distance travelled, which are determined based on the effective longitudinal speed and the actual longitudinal, transverse and vertical accelerations of the road vehicle 1. In other words, the control unit 13 increases the equivalent use counter UCeqv1 of the corresponding component by a quantity based on the interval of elapsed time/actual distance travelled and on the ratio between actual speeds/accelerations and maximum speeds/accelerations. For example, the control unit 13 determines a wear factor based on the actual speeds and accelerations and increases the equivalent use counter UCeqv1 of the corresponding component by a quantity equal to the product between the elapsed time/actual distance travelled interval and the wear factor. This means, the lower the actual speeds and accelerations, the smaller the increase of the equivalent use counter UCeqv1 with the same elapsed operating time/actual distance travelled.

According to a possible, but non-limiting, embodiment shown in FIG. 3, alternatively or in combination with the equivalent use counter UCeqv1, the memory 15 of some electronic identification devices 14 contains a plurality of use counters UC10-UC100 indicating the actual operating time/actual distance travelled of the corresponding component at different levels of stress (speed and acceleration). For example, ten use counters UC10-UC100 are provided indicating the actual operating time/actual distance travelled of the corresponding component at 10%, 20%, 30% . . . 90%, 100% of maximum stress. According to a possible embodiment shown in FIG. 2, it is further provided an equivalent use counter UCeqv2 that contains a value calculated, for example, by linear combination (with obviously different weights) of the ten use counters UC10-UC100 and constitutes an equivalent operating time/equivalent distance travelled of the component that takes into account the actual stresses to which the component is subjected during its use. Obviously, in the calculation of the equivalent use counter UCeqv2 the use under a modest stress (i.e. the use counters UC10-UC30) counts less than the time of use under a high stress (i.e. the use counters UC10-UC100) and the weights combined with the ten use counters UC70-UC100 are generally determined by means of theoretical calculations and possibly experimentally refined (i.e. by experimental tests).

According to a possible embodiment, electronic identification devices 14 could also be associated with tools and instruments used to perform technical interventions on the road vehicle 1. In this way, before starting the road vehicle 1, the control unit 13 can check that there are no "forgotten" tools and instruments inside the road vehicle 1.

According to a preferred embodiment, the control unit 13 signals the need for a maintenance/revision/replacement operation on a component of the road vehicle 1 according to the data stored in the memory 15 of the corresponding electronic identification device 14. To determine the need for a maintenance/revision/replacement of a component, the control unit 13 takes into account all the data contained in the memory 15 of the corresponding electronic identification device 14 and relating to the events of the working life of the corresponding component. Obviously, a greater importance is given to the use counter UC indicating the actual operating time/actual distance travelled by the corresponding component, but all other data are also taken into due account to anticipate or delay the maintenance/revision/replacement in the event the component were less stressed or more stressed than the average.

According to a possible embodiment, the control unit 13 cyclically reads some or all of the data contained in the memories 15 of all the electronic identification devices 14, stores this data in its own local mass storage device (typically a hard disk or a solid state memory) and transmits this data to a remote server of the manufacturer of the road vehicle 1. In this way, by collecting the data coming from all road vehicles 1, the manufacturer of the road vehicle 1 can carry out large-scale statistical elaborations, which allow the optimization of the predictive maintenance of road vehicles 1. The predictive maintenance is a type of preventive maintenance carried out following the identification of one or more parameters that are measured and extrapolated using appropriate mathematical models to identify the time left before the failure. Moreover, in this way, the manufacturer of the road vehicle 1 can know in real time the actual composition of each road vehicle 1, namely it can know exactly all the components that are currently fitted (and are therefore operating) on each road vehicle 1. It can therefore plan with greater certainty the production of spare parts and is further able to check that all the components that are currently fitted (and therefore operating) on each road vehicle 1 in the world are completely compatible with each other.

Each time the control unit 13 receives a request to start the road vehicle 1, it reads all the electronic identification devices 14 to determine the univocal identifying code IDC of the components present on the road vehicle 1. Moreover, each time the control unit 13 receives a request to start the road vehicle 1, it determines the site of use of the road vehicle 1 (i.e. whether the road vehicle 1 is in a traffic-open road or in a private race track) and checks that the univocal identifying codes IDC of the components present on the road vehicle 1 are consistent with the site of use of the road vehicle 1 and/or are consistent with each other. In other words, the control unit 13 checks, for example, whether all the components are homologated if the road vehicle 1 is in a traffic-open road to prevent a road vehicle 1 not in order, or at least provided with at least one unapproved component and therefore not usable in a traffic-open road, from being mistakenly used in a traffic-open road. Moreover, the control unit 13 checks that the components are consistent with one another, namely that they are suitable to work together, for example to prevent a track tire from being fitted on an unsuitable rim, or to prevent two non-compatible exhaust system parts from being used together, or to prevent an anti-roll bar from being used with a non-compatible suspension 12. Please note that two components are compatible when their simultaneous presence not only does not cause damage, but also allows the road vehicle 1 to achieve an optimal performance.

According to a possible embodiment, when the control unit 13 checks that the components present on the road vehicle 1 are consistent with the site of use of the road vehicle 1, it also checks that the components are suitable or unsuitable to (consistent with) the particular race track (obviously in the case of use in a private race track) in which the road vehicle 1 is actually located. For example, if the road vehicle 1 is in the Monza race track, the control unit 13 checks that the brake callipers are suitable for the type of braking mostly occurring in the Monza race track, which is generally more intense and prolonged than the braking occurring in other slower race tracks (such as the Mugello or the Misano race tracks). Preferably, the control unit 13 determines the site of use of the road vehicle 1 by determining the position of the road vehicle 1 by means of a satellite positioning device and then checking, in a map of the territory, whether the road vehicle 1 is in a traffic-open road or in a private race track (and also in which private race track). Alternatively, the control unit 13 determines the site of use of the road vehicle 1 based on information provided by the driver or depending on whether the driver turns on the road vehicle 1 using a standard starter key (i.e. for the use of the vehicle in traffic-open roads) or using a special starter key (i.e. for the exclusive use in a race track).

According to a possible embodiment, each time the control unit 13 receives a request to start the road vehicle 1, it denies the consent to start the road vehicle 1 if the univocal identifying codes IDC of the components present on the road vehicle 1 are not consistent with the site of use of the road vehicle 1 and/or are not consistent with each other. Alternatively, each time the control unit 13 receives a request to start the road vehicle 1, it allows the starting but generates a signal to the driver if the univocal identifying codes IDC of the components present on the road vehicle are not consistent with the site of use of the road vehicle 1 and/or are not consistent with each other.

According to a possible embodiment, it is provided at least one sensor 21 (shown in FIG. 1) that determines the height from the ground of the road vehicle 1, for example by reading directly the distance from the ground or by detecting the position of the suspensions 12. Each time the control unit 13 receives a request to start the road vehicle 1, it determines the site of use of the road vehicle 1 and checks that the height of the road vehicle 1 is consistent with the site of use of the road vehicle 1. Therefore, it generally denies the consent to start if the height from the ground of the road vehicle 1 is too low for traffic-open roads and sends a signal if the height of the road vehicle 1 is unnecessarily too high for a race track.

According to a preferred embodiment shown in the attached figures, the transmission organs 16 and 18 transmit wirelessly, namely they operate in radio frequency.

According to an alternative embodiment not shown, the transmission organs 16 and 18 could be (at least partially) part of a wired communication network (e.g. operating according to the CAN or LIN protocol).

According to a preferred embodiment shown in the attached figures, the road vehicle 1 comprises a plurality of components provided with the corresponding electronic identification devices 14. However, an alternative (minimal) embodiment provides for the presence of a single component provided with a corresponding electronic identification device 14.

The embodiments described herein can be combined with each other without departing from the scope of protection of the present invention.

The road vehicle 1 described above has numerous advantages. First, in the road vehicle 1 described above, the control unit 13 is able to check independently, quickly and with great reliability if all the components fitted in the road vehicle 1 are consistent with the site of use and even if they are consistent among them. This allows avoiding using the road vehicle 1 with wrong configurations. In other words, if a modification of the configuration of the road vehicle 1 (namely the set of hardware components of the road vehicle 1 and the software settings that regulate its operation) creates errors or omissions that make the configuration inconsistent, the control unit 13 detects them at the first starting request and allows the correction of the error, thus avoiding the risk of damaging the road vehicle 1 and the risk of being sanctioned for the use of an irregular road vehicle 1.

Furthermore, in the road vehicle 1 described above, the control unit 13 is able to independently, quickly and with great reliability check whether there are worn components (namely to be maintained or replaced) by reading the previous history of each component. This function is particularly important when using racing components that can be used at different times by more than one road vehicle 1 (for example, wheels or anti-roll bars).

In the road vehicle 1 described above, the control unit 13 is able to plan the maintenance of all its components in an extremely precise and reliable manner, regardless of the fact that some components are often fitted and/or removed from the road vehicle 1.

In the road vehicle 1 described above, the control unit 13 is able to make best use of each component, since the component, through the control parameters CT1-CT3 stored in the memory 15 of the corresponding electronic identification device 14, communicates to the control unit the optimal use modes (particularly in the case of special "aftermarket" components for racing use).

Moreover, the road vehicle 1 described above is of simple and inexpensive manufacture since, from a hardware point of view, it differs from a known equivalent road vehicle only for the presence of low-cost and easily available commercial components (the electronic identification devices 14 formed for example by passive transponders).

LIST OF REFERENCE NUMBERS OF THE FIGURES 1 road vehicle
2 front wheels
3 rear wheels
4 power propulsion system
5 engine
6 drive shaft
7 transmission
8 transmission shaft
9 gearbox
10 axle shafts
11 differential
12 shock absorbers
13 control unit
14 electronic identification device
15 memory
16 transmission organ
17 antenna
18 transmission organ
19 antenna
20 acceleration sensor
21 sensor

The invention claimed is:
1. A high-performance road vehicle (1) comprising:
a plurality of replaceable or removable components;
a control unit (13) configured to control an operation of the road vehicle (1);
at least one electronic identification device (14), which is fitted on a corresponding component, comprises a memory (15) configured to contain at least one univocal identifying code (IDC) of the component and comprises a first transmission device (16), which is configured to send data contained in the memory (15); and
a second transmission device (18), which is configured to communicate with the first transmission device (16) and is connected to the control unit (13) so as to allow the control unit (13) to interact with the electronic identification device (14);
wherein the memory (15) of the at least one electronic identification device (14) contains a record of events of a working life of the component; and wherein the control unit (13) is designed to modify, through the second transmission device (18), the content of the memory (15) of the at least one electronic identification device (14) to update the events of the working life of the component;

wherein each time the control unit (13) receives a request to start the road vehicle (1), the control unit (13) is configured to perform a reading of all of the at least one electronic identification devices (14) to determine the univocal identifying codes (IDC) of the components present on the road vehicle (1);

wherein each time the control unit (13) receives the request to start the road vehicle (1), the control unit (13) is configured to determine a site of use of the vehicle (1) by determining whether the road vehicle (1) is used in a traffic-open road or in a private race track;

wherein each time the control unit (13) receives the request to start the road vehicle (1), the control unit (13) is configured to check whether all the univocal identifying codes (IDC) of the components present on the road vehicle (1) are consistent with the site of use of the road vehicle (1) by determining that there are no univocal identifying codes (IDC) corresponding to components approved only for use in a race track in the event that the vehicle (1) is used in a traffic-open road or that there are no univocal identifying codes (IDC) corresponding to components approved only for use in traffic-open roads in the event that the vehicle (1) is used in a private race track; and wherein each time the control unit (13) receives the request to start the road vehicle (1), the control unit (13) is configured to deny the consent to start the road vehicle (1) when the univocal identifying codes (IDC) of the components present on the road vehicle (1) are not consistent with the site of use of the road vehicle (1).

2. The road vehicle (1) according to claim 1, wherein each of the at least one electronic identification devices (14) consists of passive transponders and the first and second transmission devices (16, 18) communicate with each other in radio frequency.

3. The road vehicle (1) according to claim 1, wherein:
the memory (15) of the at least one electronic identification device (14) contains a use counter (UC) indicating an actual use time and/or path of the component; and
the control unit (13) cyclically changes, when the road vehicle (1) is moving, the content of the memory (15) of the at least one electronic identification device (14) so as to increase the use counter (UC) of the component.

4. The road vehicle (1) according to claim 1, wherein the control unit (13) determines a need for a maintenance/revision/replacement intervention to be carried out on the component depending on the data stored in the memory (15) of the at least one electronic identification device (14).

5. The road vehicle (1) according to claim 1, wherein:
the road vehicle comprises at least one first sensor (20), which is designed to measure a physical quantity correlated with stresses to which the component is subjected;
the memory (15) of the at least one electronic identification device (14) contains at least one stress datum (STR1, STR2), which is correlated with the physical quantity measured by the first sensor; and
the control unit (13) cyclically reads the first sensor (20) and, when necessary, updates the stress datum (STR1, STR2) of the memory (15) of the at least one electronic identification device (14).

6. The road vehicle (1) according to claim 5, wherein the stress datum (STR1, STR2) contains a minimum, maximum and/or mean value of the physical quantity measured by the first sensor (20).

7. The road vehicle (1) according to claim 5, wherein the memory (15) of the electronic identification device (14) contains a plurality of stress counters (UC10-UC100) indicating an actual use time and/or path of the corresponding component at different values of the physical quantity measured by the first sensor (20).

8. The road vehicle (1) according to claim 5, wherein the first sensor (20) is an accelerometer.

9. The road vehicle (1) according to claim 1, wherein:
the memory (15) of the electronic identification device (14) contains a first installation date (DTM) of the component in the road vehicle (1); and
the control unit (13) writes the first installation date (DTM) in the memory (15) of the at least one electronic identification device (14) when the corresponding component is installed for a first time in the road vehicle (1).

10. The road vehicle (1) according to claim 1, wherein:
the memory (15) of the at least one electronic identification device (14) contains a univocal identifying code (IDCM) of the road vehicle (1); and
the control unit (13) writes the univocal identifying code (IDCM) of the road vehicle (1) in the memory (15) of the at least one electronic identification device (14) when the corresponding component is installed for a first time in the road vehicle (1).

11. The road vehicle (1) according to claim 1, wherein the memory (15) of the at least one electronic identification device (14) contains a last revision date (DTO).

12. The road vehicle (1) according to claim 1, wherein:
the memory (15) of the at least one electronic identification device (14) fitted on the component is designed to contain a value of at least one control parameter (CT1-CT3); and
the control unit (13) reads the value of the control parameter (CT1-CT3) in the memory (15) of the at least one electronic identification device (14) fitted on the component and uses the value of the control parameter (CT1-CT3) to control a part of the operation of the road vehicle (1) that involves the component.

13. The road vehicle (1) according to claim 1, wherein:
at least two electronic identification devices (14) are fitted on corresponding components;
each time the control unit (13) receives the request to start the road vehicle (1), the control unit (13) is configured to check whether all the univocal identifying codes (IDC) of the components present on the road vehicle (1) are consistent with each other by determining whether each univocal identifying code (IDC) is suitable for operating with all other univocal identifying codes (IDC); and
each time the control unit (13) receives the request to start the vehicle (1), the control unit (13) is configured to deny the consent to start the road vehicle (1) when at least one univocal identifying code (IDC) of a component on the road vehicle (1) is not consistent with a univocal identifying code (IDC) of another component on the road vehicle (1).

14. The road vehicle (1) according to claim 1, wherein:
the road vehicle (1) comprises at least one second sensor (21) that determines a height from the ground of the road vehicle (1);
each time the control unit (13) receives the request to start the road vehicle (1), the control unit (13) is configured to determine a site of use of the road vehicle (1) by determining whether the road vehicle (1) is used in a traffic-open road or in a private race track;

each time the control unit (13) receives the request to start the road vehicle (1), the control unit (13) is configured to check whether a height from the ground of the road vehicle (1) is consistent with the site of use of the road vehicle (1); and each time the control unit (13) receives the request to start the road vehicle (1), the control unit (13) is configured to deny the consent to start the road vehicle (1) when the height from the ground of the road vehicle (1) is not consistent with the site of use of the road vehicle (1).

15. A high-performance road vehicle (1) comprising a control unit (13), which controls an operation of the road vehicle (1), and at least one sensor (21) that determines a height from the ground of the road vehicle (1);

wherein each time the control unit (13) receives a request to start the road vehicle (1), the control unit (13) is configured to determine a site of use of the road vehicle (1) by determining whether the road vehicle (1) is used in a traffic-open road or in a private race track;

wherein each time the control unit (13) receives the request to start the road vehicle (1), the control unit (13) is configured to check whether the height from the ground of the road vehicle (1) is consistent with the site of use of the road vehicle (1); and wherein each time the control unit (13) receives the request to start the road vehicle (1), the control unit (13) is configured to deny the consent to start the road vehicle (1) when the height from the ground of the road vehicle (1) is not consistent with the site of use of the road vehicle (1).

* * * * *